United States Patent [19]

Uedaira et al.

[11] Patent Number: 4,520,004

[45] Date of Patent: May 28, 1985

[54] METHOD OF MANUFACTURING METAL TITANATE FINE POWDER

[75] Inventors: Satoru Uedaira, Yokohama; Hiroshi Yamanoi, Hiratsuka; Hidemasa Tamura, Yokohama, all of Japan

[73] Assignee: Sony Corporation, Tokyo, Japan

[21] Appl. No.: 524,601

[22] Filed: Aug. 19, 1983

[30] Foreign Application Priority Data

Sep. 8, 1982 [JP] Japan .................................. 57-156315

[51] Int. Cl.³ .............................................. C01G 23/00
[52] U.S. Cl. .................................................... 423/598
[58] Field of Search ......................................... 423/598

[56] References Cited

U.S. PATENT DOCUMENTS 2,218,655 10/1940 Peterson ................................ 423/598
4,061,583 12/1977 Murata et al. ........................ 423/598
4,173,485 11/1979 Woditsch et al. .................... 423/598

OTHER PUBLICATIONS

Flaschen, "J. of American Chem. Soc.," vol. 77, 1955, p. 6194.
Gray et al., "U.S. Atomic Energy Commission Report MND-3062-8", by Martin Co., Baltimore, Md., Aug. 1964, pp. 1-7.

Primary Examiner—H. T. Carter
Attorney, Agent, or Firm—Hill, Van Santen, Steadman & Simpson

[57] ABSTRACT

A method of manufacturing metal titanate fine powder which is represented as $MTiO_3$ wherein M is one of Ba, Sr and Ca is disclosed which includes the steps of preparing hydrolyzed compound of titanium compound and reacting the hydrolyzed compound of titanium compound with water soluble metal salt of one of Ba, Sr and Ca in an aqueous alkaline solution having pH not less than 13.

22 Claims, 26 Drawing Figures

METHOD OF MANUFACTURING METAL TITANATE FINE POWDER

BACKGROUND OF THE INVENTION

1. Field of the Invention

The present invention relates generally to a method of manufacturing metal titanate fine powder and more particularly is directed to a method of manufacturing barium titanate, strontium titanate and calcium titanate fine powder by liquid-phase reaction.

2. Description of the Prior Art

Recently, manufacturing of metal titanate ultra-fine powder such as barium titanate $BaTiO_3$, strontium titanate $SrTiO_3$ and calcium titanate $CaTiO_3$ ultra-fine powders has been requested from various points of view. One of such requirements relates to a multilayer ceramic condenser. The condenser is required to be small-sized and light-weighted similarly to other electronic parts. In the aspect peculiar to the condenser, the condenser is required to be of large capacitance. For this reason, the above multilayer ceramic condenser caught attention. In the multilayer ceramic condenser, barium titanate $BaTiO_3$, strontium titanate $SrTiO_3$, calcium titanate $CaTiO_3$ and so on are employed as ferroelectric material. In this case, in order to make the thickness of the multilayer ceramic condenser thin and uniform, it is requested to make the above material ultra-fine powders. In addition, in this multilayer ceramic condenser, lead is mixed into its material in view of firing property and temperature characteristic. If the firing temperature is high, the lead is partly evaporated so that the multilayer ceramic condenser of uniform characteristic can not be provided. If the ultra-fine powder of the metal titanate such as barium titanate $BaTiO_3$ or the like is finer, the firing temperature can be suppressed lower, so that also in this point, these metal titanates are required to be ultra-fine powder.

Moreover, the metal titanate ultra-fine powder such as barium titanate $BaTiO_3$, strontium titanate $SrTiO_3$, calcium titanate $CaTiO_3$ ultra-fine powder and so on is desired as electrostrictive material and piezoelectric material for the purpose of improving the characteristics thereof. Further, the metal titanate ultra-fine powder is demanded as transparent ceramics. Because, as described above, if the particle size is fine and uniform, it is expected that the firing temperature can be lowered.

By the way, barium titanate $BaTiO_3$, strontium titanate $SrTiO_3$, calcium titanate $CaTiO_3$ or the like has been manufactured by calcination. More particularly, barium carbonate $BaCO_3$ powder and titanium oxide powder are mixed and calcined at 1000° to 1200° C. Or strontium carbonate $SrCO_3$ powder and titanium oxide powder are mixed and calcined at 1000° to 1300° C. to cause calcination or calcium carbonate $CaCO_3$ powder and titanium oxide powders are mixed and calcined at 1000° to 1200° C. to cause calcination. The calcined material thus made is mechanically ground to be fine powder. Thus, the particle size was significantly large and was not uniform. Accordingly, in order to obtain the fine and uniform particle, it is necessary to perform the sieving to eliminate large particle.

On the other hand, recently, it has been proposed to synthesize the metal titanate fine particle such as barium titanate $BaTiO_3$ and strontium titanate $SrTiO_3$, by employing metal alkoxide. This previously proposed method, however, results in high manufacturing cost and therefore is not carried out in practice. The size of $BaTiO_3$ particle manufactured by this method is 500 Å.

The crystal system of barium titanate $BaTiO_3$ obtained according to the above calcination method was tetragonal system ($a_0=3.994$ Å and $c_0=4.038$ Å), and the crystal system of the product produced by the alkoxide method was cubic.

OBJECTS AND SUMMARY OF THE INVENTION

It is an object of the present invention to provide an improved method of manufacturing metal titanate fine powder.

It is another object of the present invention to provide a method of manufacturing metal titanate fine powder having a small and uniform particle size.

It is a further object of the present invention to provide a method of manufacturing metal titanate fine powder with low manufacturing cost.

According to one aspect of the present invention, there is provided a method of manufacturing metal titanate fine powder which is represented as $MTiO_3$ wherein M is one of Ba, Sr and Ca, comprising:

preparing hydrolyzed compound of titanium compound; and reacting said hydrolyzed compound of titanium compound with water soluble metal salt of one of Ba, Sr and Ca in an aqueous alkaline solution having pH not less than 13.

The other objects, features and advantages of the present invention will become apparent from the following description taken in conjunction with the accompanying drawings through which the like references designate the same elements and parts.

DESCRIPTION OF THE PREFERRED EMBODIMENTS

Figure 1:
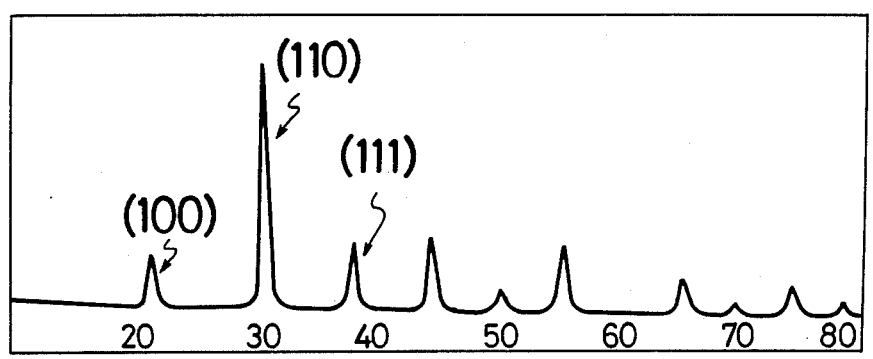
FIG. 1 is a graph showing an X-ray diffraction pattern of barium titanate $BaTiO_3$ fine powder made according to the present invention.

Now, the present invention will hereinafter be described with reference to the attached drawings and photographs.

According to the method of the present invention, upon manufacturing metal titanate $MTiO_3$ (where M is barium Ba, strontium Sr or calcium Ca) fine powder, hydrolyzation product of titanium Ti compound and water soluble metal salt are reacted in strong alkaline aqueous solution or suspension.

At first, the present invention will hereinafter be described in detail in connection with a case of manufacturing barium titanate $BaTiO_3$ fine powder. According to the present invention, titanium Ti compound is prepared first. Titanium compound can be, for example, titanium tetrachloride $TiCl_4$, titanyl sulfate $Ti(SO_4)_2$ and titanoxy sulfate $TiOSO_4$. This titanium Ti compound is hydrolyzed. For example, the above $TiCl_4$ and $Ti(SO_4)_2$ aqueous solutions are made neutral to thereby obtain $TiO_2 \cdot xH_2O$. When $Ti(SO_4)_2$ is employed, in order to remove sulfate group, the rinsing by water is performed to filter $TiO_2 \cdot xH_2O$.

Next, a water soluble barium salt is prepared and then reacted with the above hydrolyzed product in the suspension of strong alkaline aqueous solution. When in the hydrolyzation reaction the filtering for removing sulfate group or the like is not required, the reaction in the suspension of strong alkaline aqueous solution can be carried out at the same time with the above hydrolyzation reaction.

The water soluble barium Ba salt can be $Ba(NO_3)_2$, $Ba(OH)_2$, $BaCl_2$ and $Ba(CH_3COO)_2$, while alkali can be LiOH, KOH, NaOH and $NH_4OH$.

The pH of the suspension of strong alkaline aqueous solution is selected to be higher than 13.0, more preferably 13.5 or above. Molar ratio between Barium Ba and titanium Ti, (Ba/Ti) is selected to be more than 0.5, more preferably 0.7 to 5. The reaction temperature is selected to be higher than 15° C., possibly up to the boiling point thereof, more preferably higher than 40° C. The reaction time is selected to be a duration of time enough for progressing the reaction.

After the reactions as described above, the filtering, rinsing and drying treatments are carried out, if necessary.

According to the method of manufacturing barium titanate $BaTiO_3$ fine powder of the present invention, barium titanate $BaTiO_3$ fine powder having the particle size small as 200 to 300 Å and uniform could be obtained. Since in the previously proposed synthesis based upon the calcination the barium titanate $BaTiO_3$ was mechanically ground to be fine powder, the above particle size of 200 to 300 Å could not be expected. When the barium titanate $BaTiO_3$ fine powder according to the present invention is employed for forming a multilayer ceramic condenser, the firing temperature can be lowered. Thus, the lead can be mixed uniformly into the barium titanate $BaTiO_3$ fine powder, removing the scattered characteristics. Then, since the dielectric constant of the material can be increased at room temperature, it is possible to give a large capacitance to the condenser itself. The barium titanate $BaTiO_3$ fine powder according to the present invention is very suitable for the electrostrictive material, the piezoelectric material and the transparent ceramics.

Moreover, since in the present invention inorganic material is used as a raw material, the manufacturing cost can be lowered significantly.

Furthermore, since the grinding process is not required in the synthesizing treatment based on the calcination as described above, impurity is never mixed into the barium titanate $BaTiO_3$ fine powder.

In this invention, the barium titanate $BaTiO_3$ of cubic system ($a_O = 4.033$ Å) could be obtained.

A case of obtaining strontium titanate $SrTiO_3$ fine powder will be described. In the same way as barium titanate $BaTiO_3$ fine powder, a hydrolyzed product of titanium Ti compound is prepared. Then, a water soluble strontium Sr salt is prepared and is reacted with the above hydrolyzed product of the titanium Ti compound in strong alkaline aqueous solution. When in the above hydrolyzed reaction it is not necessary to carry out the filtering such as removal of sulfate group and so on, the reaction in the strong alkaline aqueous solution can be carried out at the same time with the above hydrolyzation reaction.

The water soluble strontium Sr salt can be $Sr(NO_3)_2$, $Sr(OH)_2$, $SrCl_2$, $Sr(CH_3COO)_2$ and $SrO$, while the alkali can be $LiOH$, $KOH$, $NaOH$ and $NH_4OH$.

The pH of strong alkali aqueous solution is selected to be more than 13.0. The molar ratio between strontium Sr and titanium Ti, (Sr/Ti) is selected to be more than 0.3, preferably in a range from 0.5 to 4. The reaction temperature is selected to be higher than 20° C., possibly up to the boiling point thereof, and more preferably higher than 60° C. The reaction time is selected to be such a sufficient time as to enable the reaction to be progressed.

After the reactions as described above, the filtering, rinsing and drying treatments are performed, if necessary.

According to a method of manufacturing strontium titanate $SrTiO_3$ fine powder of the present invention, the $SrTiO_3$ fine powder having small particle size of 100 to 200 Å and uniform can be obtained. Since in the previously proposed synthesis according to the calcination the strontium titanate $SrTiO_3$ was mechanically ground to be fine powder, the above particle size could not be expected. When the strontium titanate $SrTiO_3$ fine powder according to the present invention is used to form the multilayer ceramic condenser, the firing temperature can be lowered and therefore the lead can be uniformly contained thereinto, thus removing the scattered characteristics. Then, since the dielectric constant of the material can be increased at room temperature, it is possible to form the condenser itself with a large capacitance. Also, the strontium titanate $SrTiO_3$ fine powder thus made is very suitable for electrostrictive material, piezoelectric material and transparent ceramics.

Moreover, since this invention employs inorganic substance as a raw material, the manufacturing cost can be lowered greatly.

Furthermore, since the grinding process required for the synthesis of the above calcination becomes unnecessary in the invention, impurity is never mixed thereinto.

According to the present invention, the strontium titanate $SrTiO_3$ of cubic system ($a_0=3.921$ Å) can be obtained.

Also, when $CaTiO_3$ fine powder is obtained, a hydrolyzed product of titanium Ti compound is prepared similarly. Then, a water soluble calcium Ca salt is prepared and reacted with the above hydrolyzed product of titanium Ti compound in the suspension of strong alkaline aqueous solution. When in the above hydrolyzed reaction it is not necessary to carry out the filtering such as removal of sulfate group and so on, the reaction in the strong alkaline aqueous solution can be carried out at the same time with the above hydrolyzation reaction.

The water soluble calcium Ca salt can be $Ca(NO_3)_2$, $Ca(OH)_2$, $CaCl_2$, $Ca(CH_3COO)_2$ and $CaO$. On the other hand, the alkali can be $LiOH$, $KOH$, $NaOH$, and $NH_4OH$.

The pH of the suspension of strong alkaline aqueous solution is selected to be higher than 13.0, more preferably higher than 13.2. The molar ratio between calcium Ca and titanium Ti, (Ca/Ti) is selected to be more than 0.3, more preferably in a range from 0.6 to 10. The reaction temperature is selected to be higher than 70° C., possibly up to the boiling point thereof, and more preferably higher than 85° C. The reaction time is selected to be a duration of time enough for progressing the reaction.

After the reactions as described above, the filtering, rinsing and drying treatments are carried out, if necessary.

According to the method of manufacturing calcium titanate $CaTiO_3$ fine powder of the present invention, calcium titanate $CaTiO_3$ fine powder having the particle size small as 1 to 3 μm and uniform could be obtained. Since in the previously proposed synthetic treatment based on the calcination the calcium titanate $CaTiO_3$ was mechanically ground to be fine powder, the calcium titanate $CaTiO_3$ powder of the above size from 1 to 3 μm as in this invention could not be expected. When the calcium titanate $CaTiO_3$ fine powder according to the present invention is employed to form the multilayer ceramic condenser, the firing temperature can be lowered. Thus, the lead can be mixed uniformly into the calcium titanate $CaTiO_3$ fine powder, removing the scattered characteristics. Then, since the dielectric constant of the material can be increased at room temperature, it is possible to make the condenser itself with a large capacitance. Also, the calcium titanate $CaTiO_3$ fine powder according to the present invention is very suitable for the electrostrictive material, the piezoelectric material and the transparent ceramics.

Moreover, since in the present invention inorganic material is used as a raw material, the manufacturing cost can be lowered greatly.

Furthermore, since the grinding process required for the synthesis of the above calcination becomes unnecessary in the invention, impurity is never mixed into the calcium titanate $CaTiO_3$.

In this invention, the calcium titanate $CaTiO_3$ fine powder of orthorhombic system could be obtained.

The present invention will hereinafter be described in detail with reference to examples.

EXAMPLE 1

Figure 2:
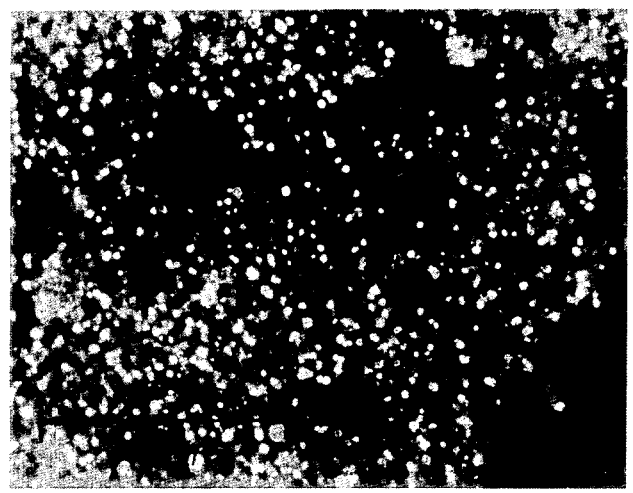
FIG. 2 is a dark image photograph by an electron microscope of barium titanate $BaTiO_3$ fine powder made according to the present invention.
Figure 3:
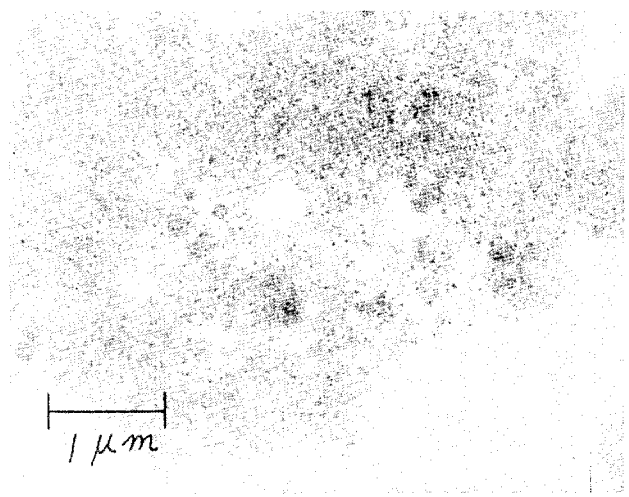
FIG. 3 is a bright image photograph by an electron microscope of barium titanate $BaTiO_3$ fine powder made according to the present invention.

50 g of titanium tetrachloride $TiCl_4$ was added and stirred into 50 ml of water to make aqueous solution to which aqueous solution including $Ba(NO_3)_2$ of molar amount equivalent to the titanium Ti was added. KOH was further added thereto to make the pH thereof as 13.5. Then, while stirring the aqueous solution, this aqueous solution was continuously reacted at the reaction temperature of 100° C. for four hours. The product made by this reaction was filtered, rinsed by water and dried at 70° C. for one day. As a result of X-ray analysis onto the product thus made, the diffraction pattern as shown in FIG. 1 was obtained. Comparing this diffraction pattern with ASTM (American society of testing materials) card, it was confirmed that the barium titanate $BaTiO_3$ thus made was of cubic system. In this case, the X-ray diffraction was performed according to the powder method in which copper target and nickel filter were employed and a time constant was selected to be "1". Moreover, as will be clear from a dark image and a bright image by an electron microscope shown in FIGS. 2 and 3, the particle size of the barium titanate $BaTiO_3$ fine powder in this example was made in a range from 200 to 300 Å and uniform.

EXAMPLE 2

50 g of titanium tetrachloride TiCl$_4$ was added and stirred into 100 g of water to make aqueous solution to which NH$_4$OH was added and hydrolyzed to be a substantially neutral aqueous solution. Thereafter, Ba(OH)$_2$ of the molar amount (0.95) approximately same as titanium Ti was added to the above neutral aqueous solution to which KOH was added to make the pH of the above aqueous solution 14. This aqueous solution was reacted at the reaction temperature of 90° C. for three hours, then filtered, rinsed by water and dried at 100° C. for one day. The product was subjected to the same X-ray analysis as described above, resulting in the diffraction pattern similar to FIG. 1. Also, the observation results by the electron microscope were the same as those of FIGS. 2 and 3.

Figure 4:
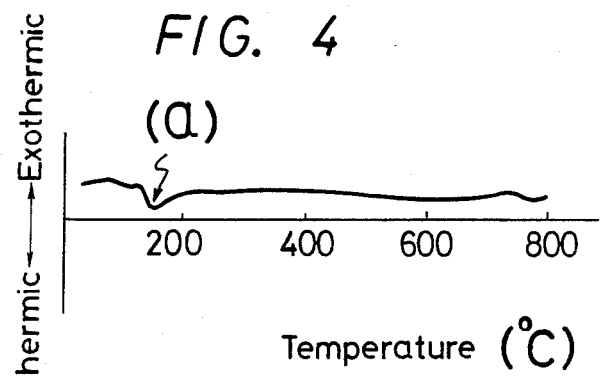
FIG. 4 is a graph showing results of differential thermal analysis of $BaTiO_3$ fine powder made according to the present invention.
Figure 5:
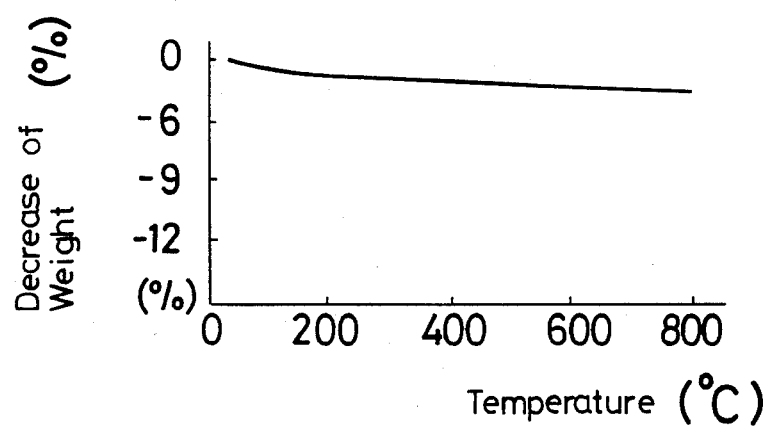
FIG. 5 is a graph showing results of thermogravimetric analysis of $BaTiO_3$ fine powder made according to the present invention.

Furthermore, the barium titanate BaTiO$_3$ fine powder according to this example was subjected to the differential thermal analysis and the thermogravimetric analysis. The results thereof are indicated as in FIGS. 4 and 5, respectively. As will be understood from these results, the barium titanate BaTiO$_3$ fine powder contains no impurity. In this case, the dropped portion on the curve shown by a reference letter a in FIG. 4 may be caused by the dehydration of the absorption water.

EXAMPLE 3

50 g of titanium tetrachloride TiCl$_4$ was added and stirred into 200 g of water to make aqueous solution to which NaOH was added to make the aqueous solution substantially neutral. Thereafter, BaO was added to the above neutral aqueous solution to which NaOH was further added to thereby make the pH of this aqueous solution 13.7. This aqueous solution thus made was reacted at 95° C. for two hours, filtered, rinsed by water and then dried at 100° C. for one day. The product was subjected to the same X-ray analysis as described above, resulting in the diffraction pattern similar to FIG. 1. Also, the observation results thereof by the electron microscope were the same as those of FIGS. 2 and 3.

EXAMPLE 4

50 g of titanium tetrachloride TiCl$_4$ was added and stirred into water to make aqueous solution to which KOH was added to make the aqueous solution substantially neutral. Then, barium Ba of the molar amount twice that of titanium Ti was added to the above neutral aqueous solution to which KOH was further added to thereby make the pH of this aqueous solution 13.3. Under this state, this aqueous solution was reacted at 95° C. for two hours. Thereafter, a top clear part of the solution was removed from the product by the decantation treatment and water was added thereto again. This treatment was repeated and the product was rinsed by water. The product thus made was then added with aqueous solution of NH$_4$Cl, filtered, rinsed by water and then dried at 100° C. for one day. This product was subjected to the same X-ray analysis as described above, resulting in the diffraction pattern similar to FIG. 1. Also, the observation results by the electron microscope were the same as those of FIGS. 2 and 3.

EXAMPLE 5

Figure 6:
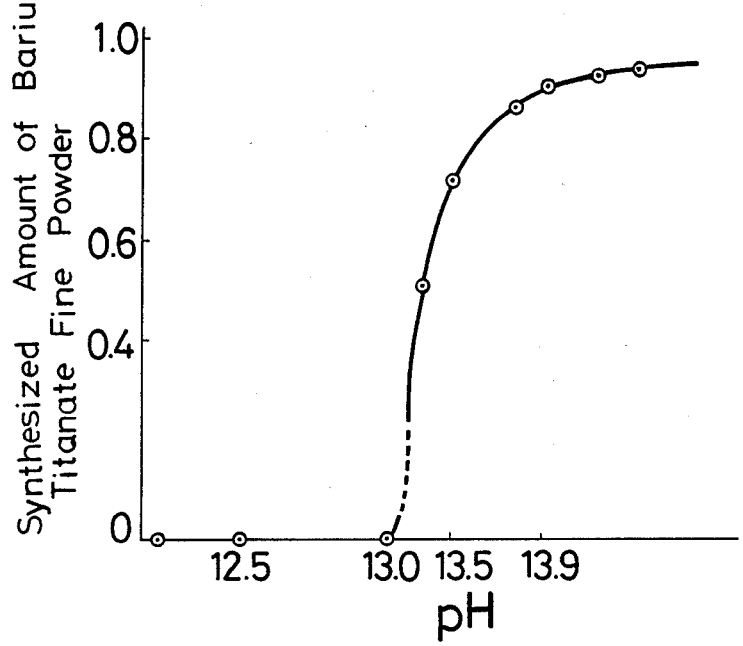
FIG. 6 is a graph showing pH dependency of synthesized amount of $BaTiO_3$ fine powder made according to the present invention.

In this example, pH dependency of the synthesized amount of barium titanate BaTiO$_3$ was examined. Barium Ba solution (suspension solution) of the molar amount equivalent to titanium Ti was added to the hydrolyzed product of titanium tetrachloride TiCl$_4$ to which KOH was then added. Then, the synthesized amount of barium titanate BaTiO$_3$ when the solution thus made was reacted at 100° C. for four hours was measured. The synthesized amount of barium titanate BaTiO$_3$ was measured each time the adding amount of KOH was varied to change the pH. The measured results were shown in a graph of FIG. 6. This graph reveals that the pH is selected to be higher than 13.0, more preferably higher than 13.5. In this case, the generation amount of the barium titanate BaTiO$_3$ was calculated from the area of the X-ray diffraction peak (110) of cubic-system perovskite. The X-ray analysis was carried out in substantially the same way as described aboved. Namely, a copper target and a cobalt filter were employed, a voltage of 35 kV and a current of 25 mA were applied and a time constant was selected to be "1".

EXAMPLE 6

Figure 7:
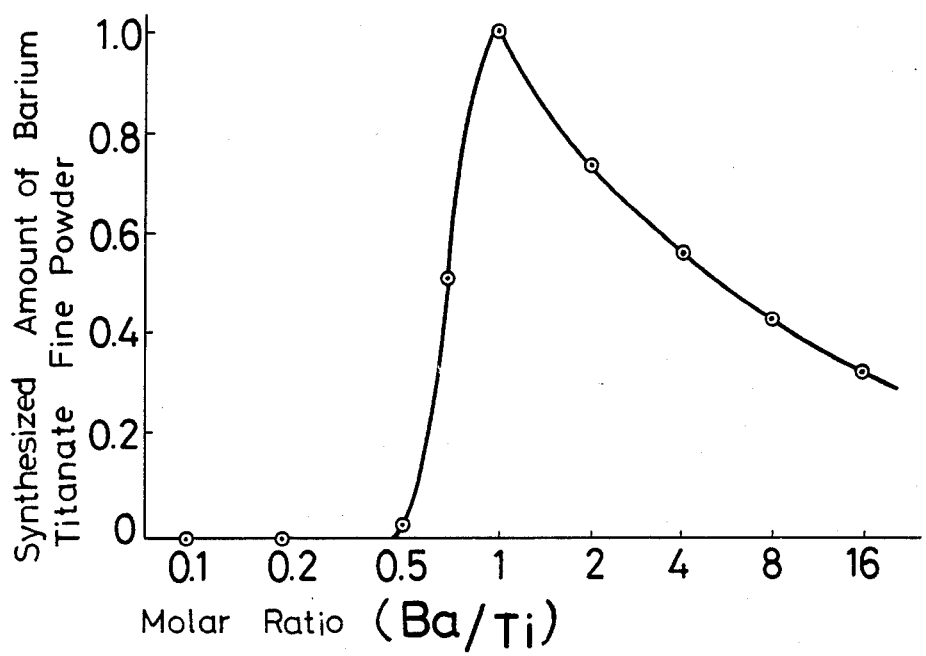
FIG. 7 is a graph showing a relation between the synthesized amount of $BaTiO_3$ fine powder made according to the present invention and the molar ratio (Ba/Ti)

In this example, the relation between the synthesized amount of barium titanate BaTiO$_3$ and the molar ratio was studied. Ba(OH)$_2$ of a predetermined amount was added to the hydrolyzed product of titanium tetrachloride TiCl$_4$ to which KOH was added to make the pH thereof as 14.0. The solution thus made was reacted at 100° C. for four hours and thereafter, the synthesized amount of the barium titanate BaTiO$_3$ was measured. While changing the amount of the Ba(OH)$_2$, dependency of the synthesized amount of the barium titanate BaTiO$_3$ upon the molar ratio (Ba/Ti) was studied. The results thereof are shown in a graph of FIG. 7. This graph reveals that the molar ratio (Ba/Ti) is selected to be higher than 0.5, more preferably in a range from 0.7 to 5. In this case, the synthesized amount of the barium titanate BaTiO$_3$ was measured in the same way as in the example 5.

EXAMPLE 7

Figure 8:
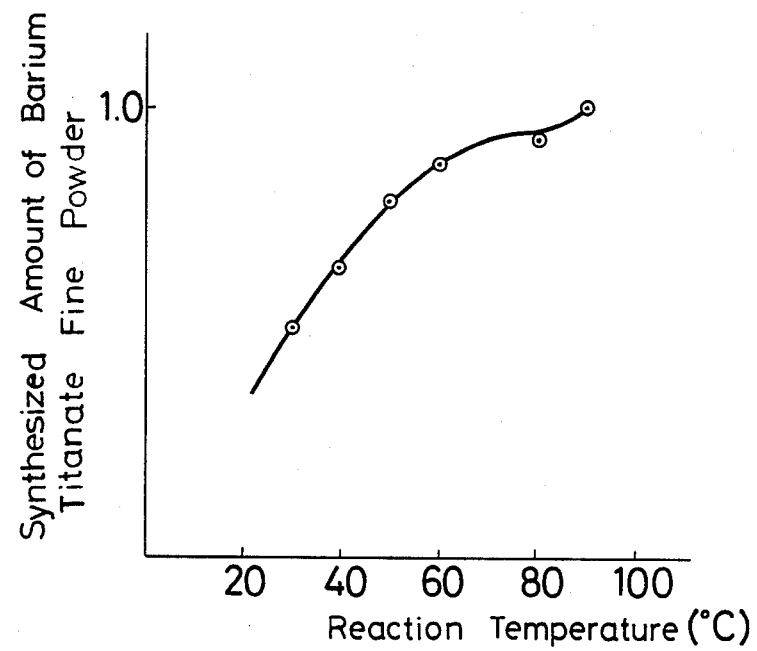
FIG. 8 is a graph showing a relation between the synthesized amount of $BaTiO_3$ fine powder made according to the present invention and the reaction temperature.

In this example, temperature dependency of the synthesized amount of barium titanate BaTiO$_3$ was studied. Barium Ba solution of the molar amount same as titanium Ti was added to the hydrolyzed product of titanium tetrachloride TiCl$_4$ to which KOH was then added to make the pH of this solution 13.9. The aqueous solution thus made was reacted for three hours. Then, the synthesized amount of the barium titanate BaTiO$_3$ was measured for every reaction temperatures changing over a range from 15° C. to the boiling point thereof. The measured results thereof are shown in a graph of FIG. 8. This graph reveals that the reaction temperature is selected in a range from 15° C. to the boiling point, more preferably higher than 40° C. In this case, the synthesized amount of the barium titanate BaTiO$_3$ was measured in the same way as in the example 5.

EXAMPLE 8

Figure 9:
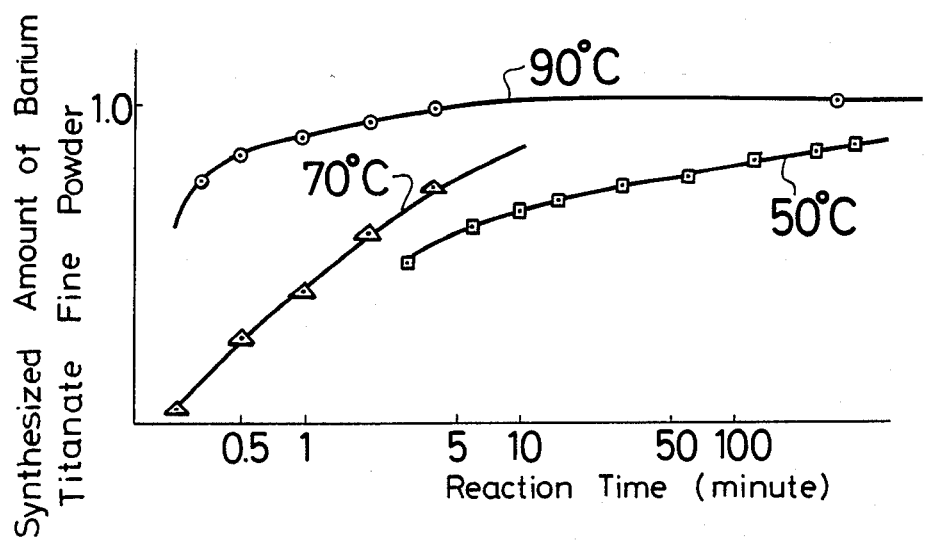
FIG. 9 is a graph showing a relation between the synthesized amount of $BaTiO_3$ fine powder made according to the present invention and the reaction time.

In this example, time dependency of the generation amount of the barium titanate BaTiO$_3$ was studied. Barium Ba solution of the molar amount equal to titanium Ti was added to the hydrolyzed product of titanium tetrachloride TiCl$_4$ to which KOH was then added to make the pH of this solution 13.9. The aqueous solution thus made was reacted at 50° C., 70° C. and 90° C., respectively. Then, the synthesized amount of the barium titanate BaTiO$_3$ was measured for every reaction time. The results thereof are shown in a graph of FIG. 9. A time enough for enabling the reaction to be progressed can be measured from this graph of FIG. 9. Also in this example, the synthesized amount of the barium titanate $BaTiO_3$ was measured in the same way as in the example 5.

EXAMPLE 9

Figure 10:
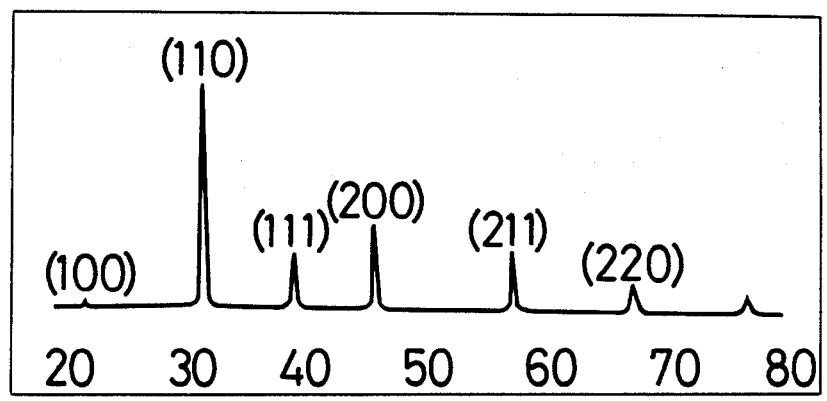
FIG. 10 is a graph indicating an X-ray diffraction pattern of strontium titanate $SrTiO_3$ fine powder made according to the present invention.
Figure 11:
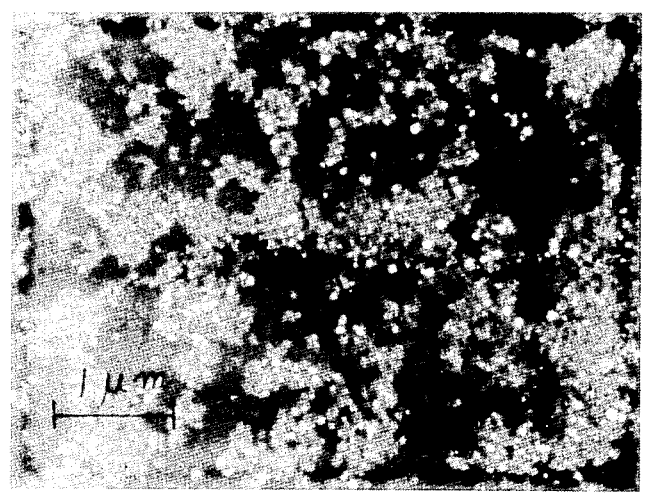
FIG. 11 is a dark image photograph by an electron microscope of strontium titanate $SrTiO_3$ fine powder made according to the present invention.
Figure 12:
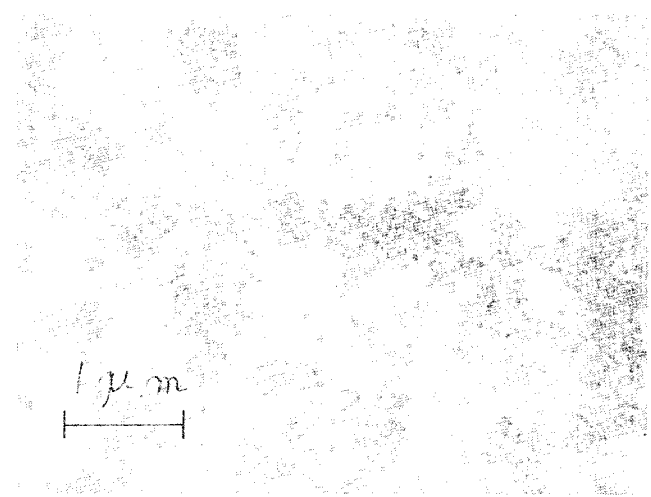
FIG. 12 is a bright image photograph by an electron microscope of $SrTiO_3$ fine powder made according to the present invention.

50 g of titanium tetrachloride $TiCl_4$ was added and stirred into 50 ml of iced water to make aqueous solution to which $Sr(NO_3)_2$ aqueous solution of the molar amount equivalent to titanium Ti was added. KOH was further added to the above solution to make the pH thereof 13.7. Thereafter, the aqueous solution thus made was continuously reacted at the reaction temperature of 100° C. for four hours. The product made according to this reaction was filtered, rinsed by water and then dried at 70° C. for one day. This product was subjected to the X-ray analysis, resulting in the diffraction pattern as shown in FIG. 10. Comparing this diffraction pattern with the ASTM card, it was confirmed that the strontium titanate $SrTiO_3$ according to this example was a cubic-system $SrTiO_3$ ($a_0 = 3.921$ Å) fine powder. In this case, the X-ray analysis was carried out according to the powder method in which the copper target and the nickel filter were employed. As will be clear from a dark image and a bright image shown in FIGS. 11 and 12 according to the electron microscope, the particle size of the strontium titanate $SrTiO_3$ fine powder was in a range from 100 to 200 Å and uniform.

EXAMPLE 10

50 g of titanium tetrachloride $TiCl_4$ was added and stirred into 100 g of water to make aqueous solution to which $NH_4OH$ is added to be hydrolyzed, thus the above solution being put into the neutral aqueous solution having the pH 7. Thereafter, $Sr(OH)_2$ of the molar amount approximately the same as titanium Ti (Sr/Ti=1.05) was added to the above neutral aqueous solution to make the pH thereof 14. The aqueous solution thus made was reacted at 95° C. for four hours. Then, the product was filtered, rinsed by water and then dried at 100° C. for one day. This product was subjected to the similar X-ray analysis, resulting in the same diffraction pattern as in FIG. 10. Moreover, the observation results by the electron microscope were the same as those in FIGS. 11 and 12.

EXAMPLE 11

50 g of titanium tetrachloride $TiCl_4$ was added and stirred into 200 g of water to make aqueous solution of titanium Ti to which NaOH was added to make the above solution neutral having the pH 7. $SrCl_2$ of the same molar amount as titanium Ti was added to the above solution to which NaOH was further added to make the pH thereof 14, which then is reacted at 100° C. for three hours. The product thus made was filtered, rinsed by water and then dried at 100° C. for one day. This product was subjected to the same X-ray analysis same as mentioned above, resulting in the diffraction pattern same as that shown in FIG. 10. Moreover, the observation results according to the electron microscope were similar to those shown in FIGS. 11 and 12.

EXAMPLE 12

$NH_4OH$ was added to 200 ml of $Ti(SO_4)_2$ aqueous solution of 30 weight % to make a neutral aqueous solution having the pH 7, which was then filtered and rinsed by water. Thereafter, the product was added with 1 l of water to which $SrCl_2$ of the molar amount equal to titanium Ti was added. Further, KOH was added thereto to make the pH thereof 14, which then is reacted at 100° C. for four hours. The product thus made was filtered, rinsed by water and then dried. This product was subjected to the similar same X-ray analysis as mentioned above, resulting in the diffraction pattern same as that shown in FIG. 10. Moreover, the observation results according to the electron microscope were similar to those shown in FIGS. 11 and 12.

EXAMPLE 13

Figure 13:
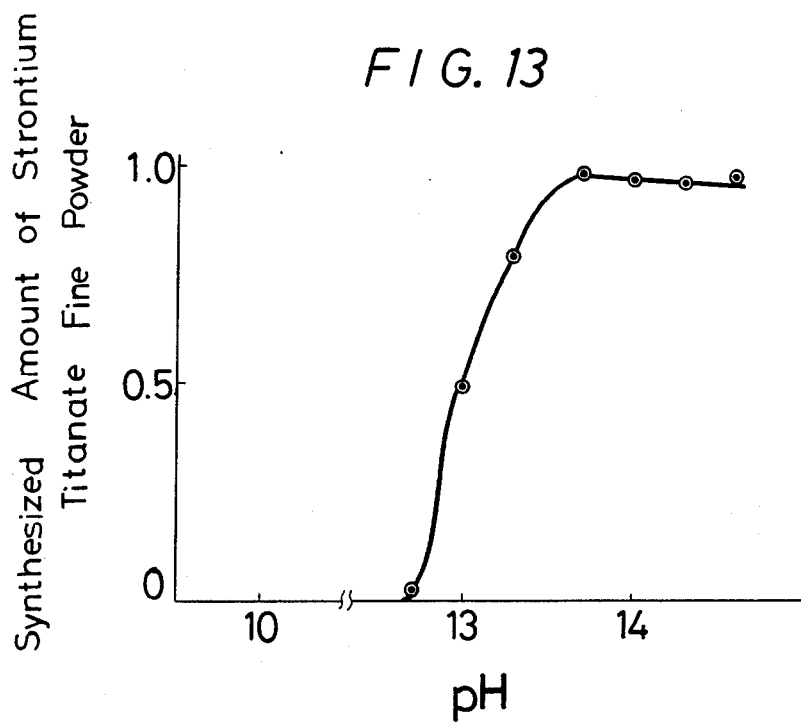
FIG. 13 is a graph indicating pH dependency of the synthesized amount of $SrTiO_3$ fine powder made according to the present invention.

In this example, pH dependency of the synthesized amount of the strontium titanate $SrTiO_3$ was measured. Titanium tetrachloride $TiCl_4$ was hydrolyzed, added with strontium Sr salt of the same molar amount as titanium Ti and then added with KOH. Then, the synthesized amount of the strontium titanate $SrTiO_3$ when the aqueous solution thus made was reacted at 100° C. for three hours was measured. In this case, the adding amount of KOH was varied so as to change the pH of the above aqueous solution. The results thereof are shown in a graph of FIG. 13. This graph reveals that the pH should be selected to be higher than 13.0. In this case, the synthesized amount of the strontium titanate $SrTiO_3$ was measured from the area of the X-ray diffraction peak (110).

EXAMPLE 14

Figure 14:
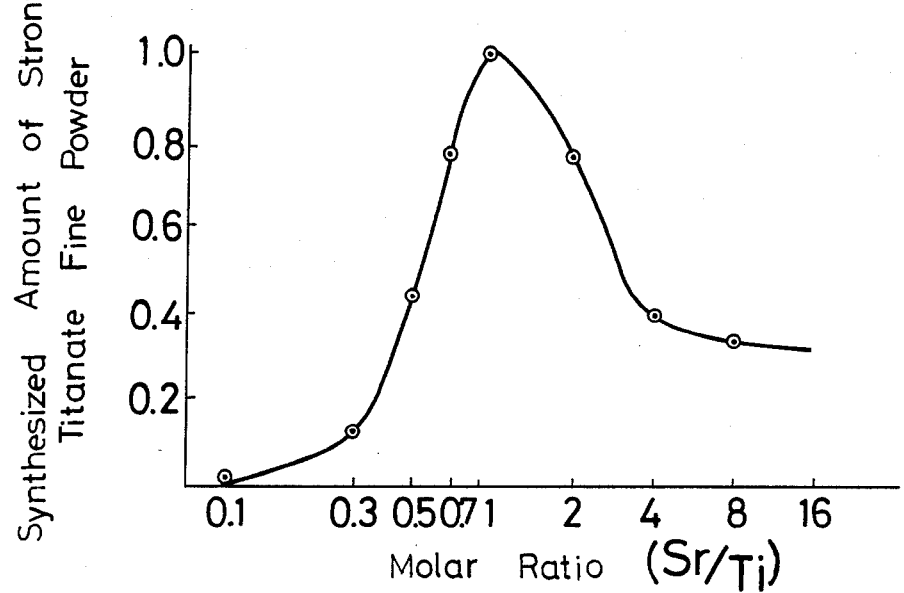
FIG. 14 is a graph indicating a relation between the synthesized amouht of $SrTiO_3$ fine powder made according to the present invention and the molar ratio (Sr/Ti)

In this example, dependency of the synthesized amount of the strontium titanate $SrTiO_3$ upon the molar ratio was studied. According to this example, the strontium titanate $SrTiO_3$ was made in the same way as in the example 13 where the pH thereof was selected as 14. Then, the molar ratio Sr/Ti was being changed. The results thereof are shown in a graph of FIG. 14. This graph reveals that the molar ratio should be selected to be higher than 0.3, more preferably in a range from 0.5 to 4. In this case, the synthesized amount of the strontium titanate $SrTiO_3$ was measured in the same way as in the example 13.

EXAMPLE 15

Figure 15:
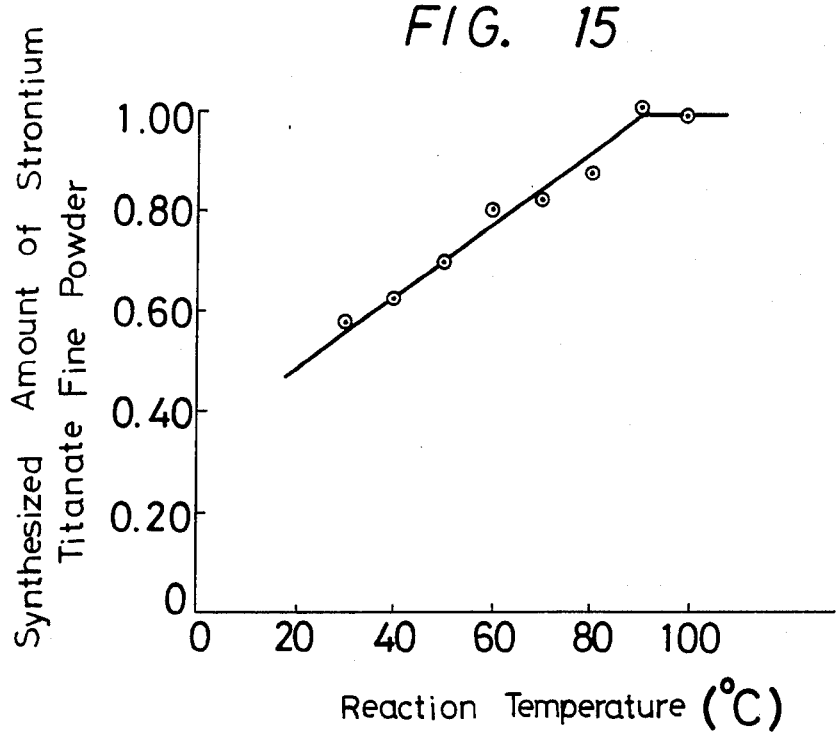
FIG. 15 is a graph indicating a relation between the synthesized amount of $SrTiO_3$ fine powder made according to the present invention and the reaction temperature.

In this example, temperature dependency of the synthesized amount of the strontium titanate $SrTiO_3$ was studied. Also in this example, the strontium titanate $SrTiO_3$ was made in the same way as in the example 13 where the molar ratio of Sr/Ti was selected to be 1.05 and the pH was selected to be 14. Then, the reaction temperature was being changed. The results thereof are shown in a graph of FIG. 15. This graph reveals that the reaction temperature is possibly selected to be in a range from higher than 20° C. to the boiling point thereof, more preferably higher than 60° C. In this case, the synthesized amount of the strontium titanate $SrTiO_3$ was measured in the same way as in the example 13.

EXAMPLE 16

Figure 16:
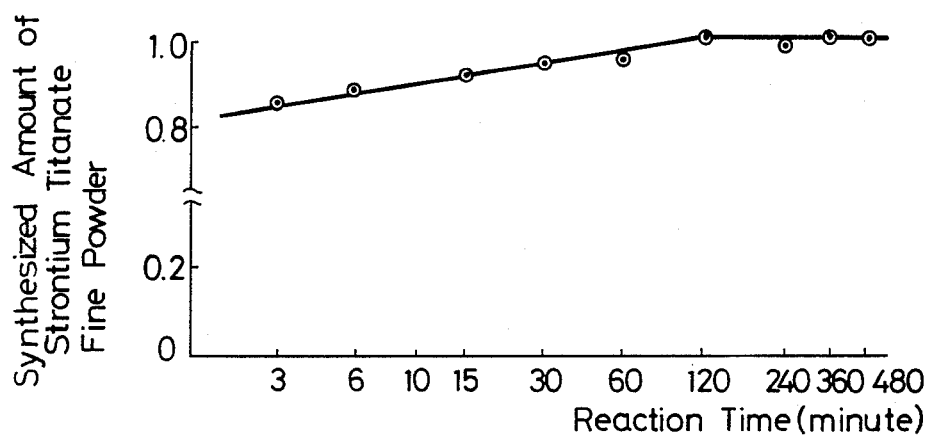
FIG. 16 is a graph indicating a relation between the synthesized amount of $SrTiO_3$ fine powder made according to the present invention and the reaction time.

In this example, time dependency of the synthesized amount of the strontium titanate $SrTiO_3$ was studied. Also in this example, the strontium titanate $SrTiO_3$ was made in the same way as in the example 13 where the pH was selected to be 14 and the molar ratio Sr/Ti was selected to be 1.05. Then, the reaction time was being changed. The results thereof are shown in a graph of FIG. 16. From this graph, it is understood that time is enough for enabling the reaction to be progressed. Also in this example, the synthesized amount of the strontium titanate SrTiO$_3$ was measured in the same way as in the example 13.

EXAMPLE 17

Figure 17:
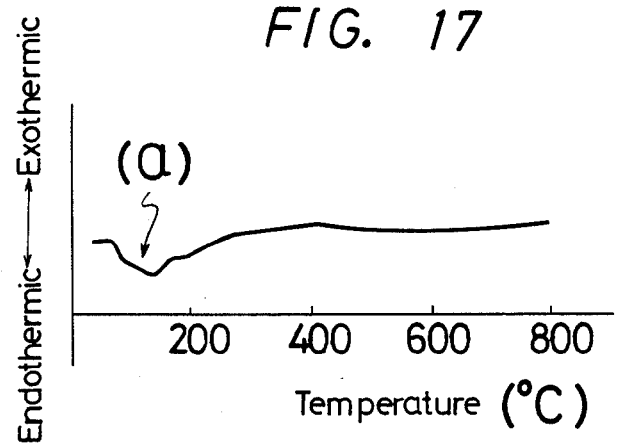
FIG. 17 is a graph indicating results of differential thermal analysis of $SrTiO_3$ fine powder according to the present invention.
Figure 18:
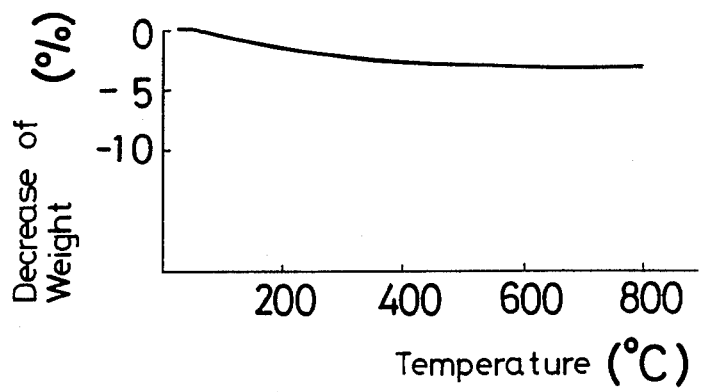
FIG. 18 is a graph indicating results of thermogravimetric analysis of $SrTiO_3$ fine powder made according to the present invention.

In this example, the differential thermal analysis and the thermogravimetric analysis were carried out. Also in this example, the strontium titanate SrTiO$_3$ was made in the same way as in the example 13 where the pH was selected to be 14. In the analysis, the temperature was raised at a rate of 20° C./min. The results thereof are shown in graphs of FIGS. 17 and 18, respectively. These graphs manifest that the SrTiO$_3$ fine powder contains no impurity. In this case, the dropped portion indicated by a reference letter a in FIG. 17 may be caused by the dehydration of the adsorption water.

EXAMPLE 18

Figure 19:
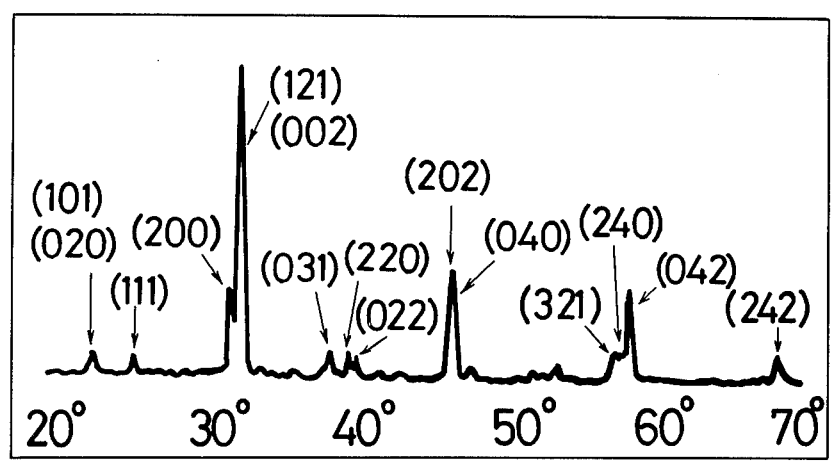
FIG. 19 is a graph indicating an X-ray diffraction pattern of calcium titanate $CaTiO_3$ fine powder made according to the present invention.
Figure 20:
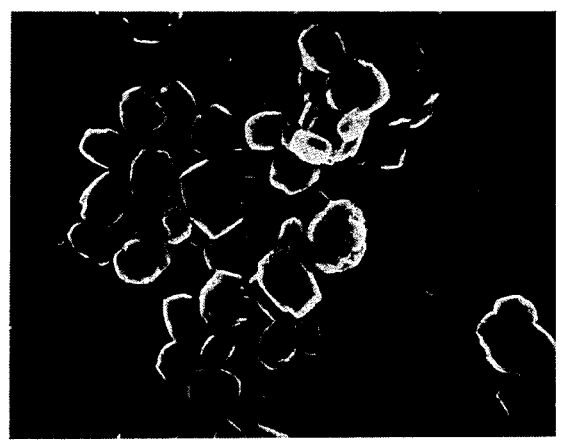
FIG. 20 is a photograph by a scanning electromicroscope indicating calcium titanate $CaTiO_3$ fine powder made according to the present invention.

50 g of titanium tetrachloride TiCl$_4$ was added and stirred into 50 ml of iced water to make aqueous solution to which Ca(NO$_3$)$_2$ aqueous solution of the same molar amount as titanium Ti was added and further KOH was added, thereby making the pH of this aqueous solution 13.7. Thereafter, while being stirred, this aqueous solution was continuously reacted at the reaction temperature of 100° C. for four hours. The product made by this reaction was filtered, rinsed by water and then dried at 70° C. for one day. This product was subjected to the X-ray analysis, resulting in a diffraction pattern shown in FIG. 19. The comparison of this diffraction pattern with the ASTM card confirmed the fact that the calcium titanate CaTiO$_3$ thus made was an orthorhombic system CaTiO$_3$. In this case, the X-ray analysis was performed according to the powder method in which a copper target and a nickel filter were used. Moreover, as will be clear from a photograph by a scanning electromicroscope in FIG. 20, the particle size of the calcium titanate CaTiO$_3$ fine powder in this example was in a range from 1 to 3 μm and uniform.

EXAMPLE 19

50 g of titanium tetrachloride TiCl$_4$ was added and stirred into 100 g of water to make aqueous solution to which NH$_4$OH was added so as to make the solution substantially neutral. Then, Ca(OH)$_2$ of molar amount substantially equal to titanium Ti was added to the above aqueous solution to which KOH was further added to make the pH thereof 14. This aqueous solution was reacted at 95° C. for four hours. Thereafter, the product thus made was filtered, rinsed by water and then dried at 100° C. for one day. This product was subjected to the same X-ray analysis as mentioned above, resulting in the diffraction pattern similar to that of FIG. 19. Also, the observation result according to the scanning electromicroscope was the same as that shown in FIG. 20.

EXAMPLE 20

50 g of titanium tetrachloride TiCl$_4$ was added and stirred into 200 g of water to make aqueous solution to which NaOH was added to make the aqueous solution substantially neutral (pH 7). Then, CaCl$_2$ of the molar amount equal to titanium Ti was added to the above aqueous solution to which NaOH was further added to make the pH thereof 14. This aqueous solution was reacted at 100° C. for three hours. Thereafter, the product thus made was filtered, rinsed by water and then dried at 100° C. for one day. This product was subjected to the same X-ray analysis as mentioned above, resulting in the diffraction pattern similar to that of FIG. 19. Also, the observation result according to the scanning electromicroscope was the same as that shown in FIG. 20.

Figure 21:
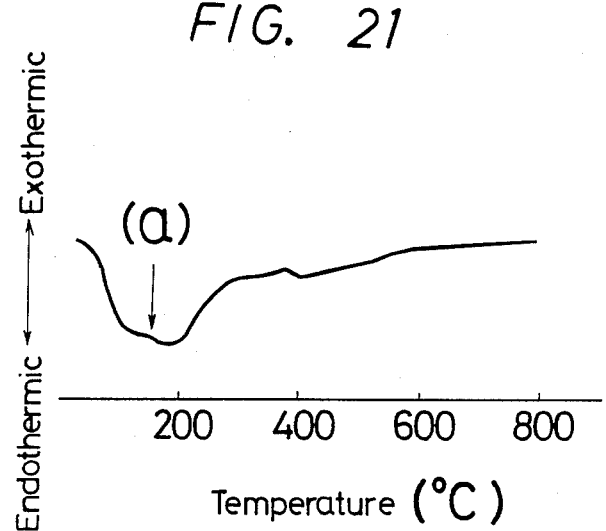
FIG. 21 is a graph indicating results of differential thermal analysis of $CaTiO_3$ fine powder according to the present invention.
Figure 22:
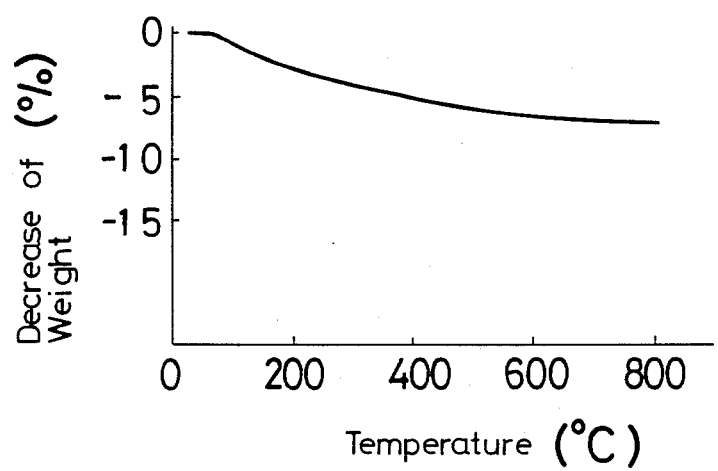
FIG. 22 is a graph indicating results of thermogravimetric analysis of $CaTiO_3$ fine powder made according to the present invention.

Moreover, the calcium titanate CaTiO$_3$ fine powder according to this example was subjected to the differential thermal analysis and the thermogravimetric analysis in which temperature was raised at a rate of 20° C. per minute. The results thereof are shown in graphs of FIGS. 21 and 22, respectively. These graphs manifest that the CaTiO$_3$ fine powder contains no impurity. In this case, the dropped portion indicated by a reference letter a in FIG. 21 may be caused by the dehydration of the adsorption water.

EXAMPLE 21

NH$_4$OH was added to 200 ml of Ti(SO$_4$)$_2$ aqueous solution of 30 weight % to make a substantially neutral aqueous solution having the pH 7, which was then filtered and rinsed by water. Thereafter, this product was added to 1 l of water to which CaCl$_2$ of the molar amount equal to titanium Ti was added. Further, KOH was added thereto to make the pH thereof 14, which then was continuously reacted at 100° C. for four hours. Thereafter, the product thus made was filtered, rinsed by water and then dried. This product was subjected to the same X-ray analysis as mentioned above, resulting in the diffraction pattern similar to that of FIG. 19. Also, the observation result according to the scanning electromicroscope was the same as that shown in FIG. 20.

EXAMPLE 22

Figure 23:
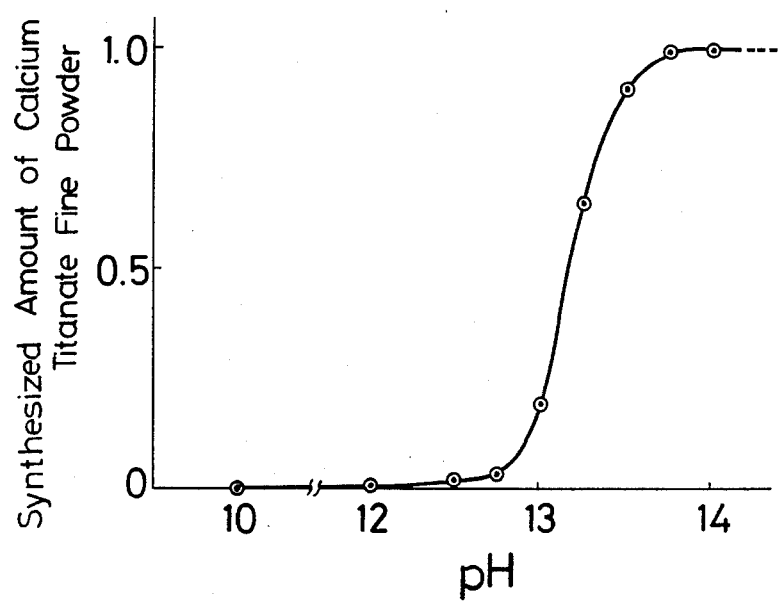
FIG. 23 is a graph indicating pH dependency of the synthesized amount of $CaTiO_3$ fine powder made according to the present invention.

In this example, pH dependency of the synthesized amount of the calcium titanate CaTiO$_3$ was studied. A calcium Ca salt of the molar amount equal to titanium Ti was added to a hydrolyzed product of titanium tetrachloride TiCl$_4$ to which KOH was added thereafter. Then, the synthesized amount of calcium titanate CaTiO$_3$ when this aqueous solution was reacted at 100° C. for three hours was measured. Then, the synthesized amount of the calcium titanate CaTiO$_3$ was measured each time the adding amount of KOH was varied to thereby change the pH. The results thereof are shown in a graph of FIG. 23. This graph reveals that the pH should be selected to be higher than 13.0, more preferably higher than 13.2. In this case, the synthesized amount of calcium titanate CaTiO$_3$ was measured from the areas of the X-ray diffraction peaks (200) and

of the orthorhombic system CaTiO$_3$. The X-ray analysis was carried out in substantially the same way as mentioned above.

EXAMPLE 23

Figure 24:
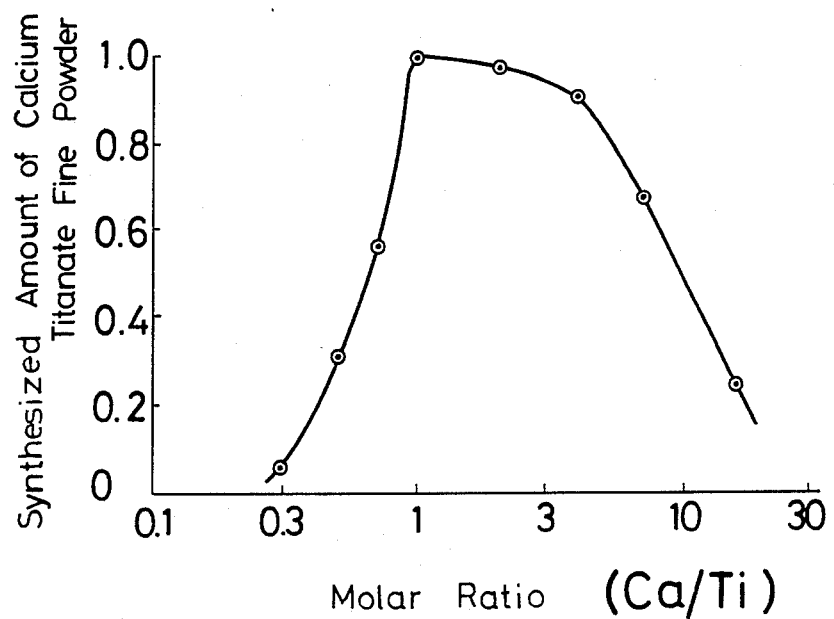
FIG. 24 is a graph indicating a relation between the synthesized amount of $CaTiO_3$ fine powder made according to the present invention and the molar ratio (Ca/Ti)

In this example, dependency of the synthesized amount of calcium titanate CaTiO$_3$ on the molar ratio was measured. Ca(OH)$_2$ of a predetermined amount was added to the hydrolyzed product of titanium tetrachloride TiCl$_4$ to which KOH was then added to make the pH thereof 14.0. Then, this aqueous solution was reacted at 100° C. for three hours. Thereafter, the synthesized amount of calcium titanate CaTiO$_3$ was measured. And, while changing the amount of Ca(OH)$_2$, thus changing the molar ratio (Ca/Ti), the synthesized amount of CaTiO3 was measured. The results thereof are shown in a graph of FIG. 24. This graph reveals that the molar ratio (Ca/Ti) should be selected to be higher than 0.3, preferably in a range from 0.6 to 10. In this case, the synthesized amount of calcium titanate CaTiO3 was measured in the same way as in the example 22.

EXAMPLE 24

Figure 25:
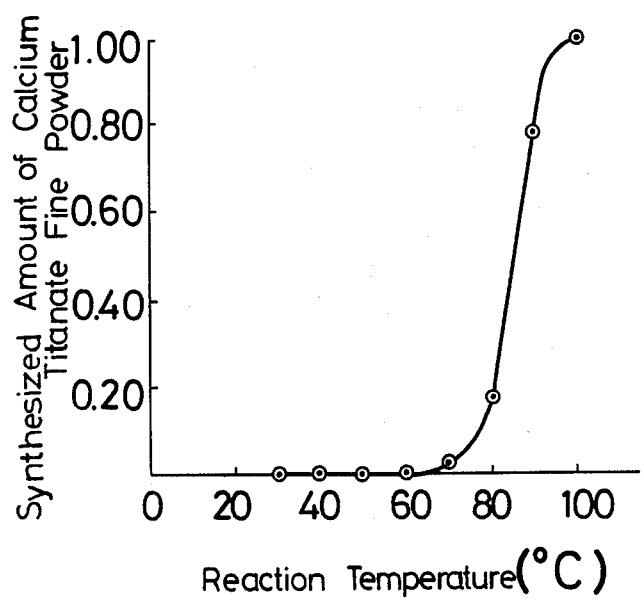
FIG. 25 is a graph indicating a relation between the synthesized amount of $CaTiO_3$ fine powder made according to the present invention and the reaction temperature.

In this example, temperature dependency of the synthesized amount of calcium titanate CaTiO3 was studied. Calcium Ca solution of the molar amount (1.05) approximately equal to titanium Ti was added to the hydrolyzed product of titanium tetrachloride TiCl4 to which KOH was added to make the pH thereof 14, which then was reacted for three hours. Then, the synthesized amount of the calcium titanate CaTiO3 was measured at every reaction temperatures. The results thereof are shown in a graph of FIG. 25. This graph reveals that the reaction temperature should be selected in a range from 70° C. to the boiling point thereof, more preferably higher than 85° C. In this case, the synthesized amount of calcium titanate CaTiO3 was measured in the same way as in the example 22.

EXAMPLE 25

Figure 26:
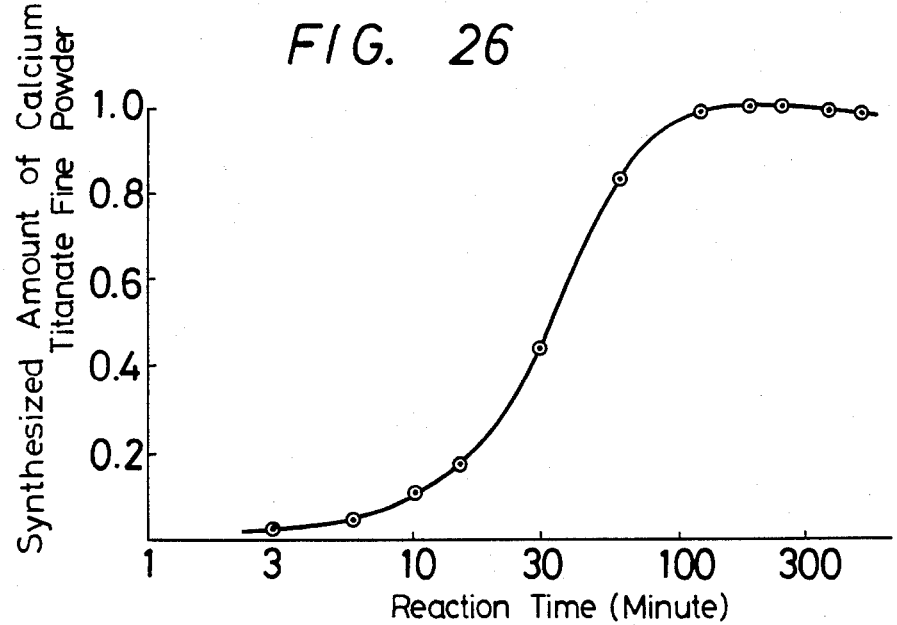
FIG. 26 is a graph indicating a relation between the synthesized amount of $CaTiO_3$ fine powder made according to the present invention and the reaction time.

In this example, time dependency of the synthesized amount of calcium titanate CaTiO3 was studied. Calcium Ca solution of the molar amount (1.05) approximately equal to titanium Ti was added to the hydrolyzed product of titanium tetrachloride TiCl4 to which KOH was added to make the pH thereof 14, which then was reacted at 100° C. And, the synthesized amount of the calcium titanate CaTiO3 was measured at every reaction times. The results thereof are shown in a graph of FIG. 26. From this graph, it is understood that a time is enough for enabling the reaction to be progressed. Also, in this example, the synthesized amount of calcium titanate CaTiO3 was measured in the same way as in the example 22.

The above description is given on the preferred embodiments of the invention, but it will be apparent that many modifications and variations could be effected by one skilled in the art without departing from the spirits or scope of the novel concepts of the invention, so that the scope of the invention should be determined by the appended claims only.

We claim as our invention:

1. A method for manufacturing a metal titanate fine powder having the formula MTiO3 wherein M is Ba, Sr, or Ca comprising the steps of:
preparing a hydrolysis product of an inorganic titanium compound $TiO_2.xH_2O$ by dissolving said inorganic titanium compound in a neutral or alkaline aqueous solution,
reacting said hydrolysis product with a water soluble salt of Ba, Sr, or Ca in an aqueous alkaline solution having a pH not less than 13 to thereby obtain said metal titanate fine powder, and
filtering said fine powder from the remaining solution.

2. A method of manufacturing metal titanate fine powder according to claim 1, wherein said titanium compound is selected from $TiCl_4$, $TiOSO_4$ and $Ti(SO_4)_2$.

3. A method for manufacturing a barium titanate fine powder having the formula BaTiO3 comprising the steps of:
preparing hydrolyzed product of an inorganic titanium compound $TiO_2.xH_2O$ by dissolving said inorganic titanium compound in a neutral or alkaline aqueous solution,
reacting said hydrolysis product with a water soluble salt of Ba in an aqueous alkaline solution having a pH not less than 13 to thereby obtain said barium titanate fine powder, and
filtering said fine powder from the remaining solution.

4. A method of manufacturing barium titanate fine powder according to claim 3, wherein said aqueous alkaline solution has pH value not less than 13.5.

5. A method of manufacturing barium titanate fine powder according to claim 3, wherein a molar ratio, Ba/Ti is selected to be not less than 0.5.

6. A method of manufacturing barium titanate fine powder according to claim 3, wherein said molar ratio, Ba/Ti is selected to be in a range from 0.7 to 5.

7. A method of manufacturing barium titanate fine powder according to claim 3, wherein a reacting temperature is selected to be not less than 15° C.

8. A method of manufacturing barium titanate fine powder according to claim 3, wherein said reacting temperature is selected in a range from 40° C. to a boiling point of the aqueous solution.

9. A method of manufacturing barium titanate fine powder according to claim 3, wherein a water soluble barium salt is selected from $Ba(NO_3)_2$, $Ba(OH)_2$, $BaCl_2$ and $Ba(CH_3COO)_2$.

10. A method for manufacturing a strontium titanate fine powder having the formula SrTiO3 comprising the steps of:
preparing a hydrolysis product of an inorganic titanium compound $TiO_2.xH_2O$ by dissolving said inorganic titanium compound in a neutral or alkaline aqueous solution.
reacting said hydrolysis product with a water soluble salt of Sr in an aqueous alkaline solution having a pH not less than 13 to thereby obtain said strontium titanate fine powder, and
filtering said fine powder from the remaining solution.

11. A method of manufacturing strontium titanate fine powder according to claim 10, wherein a molar ratio, Sr/Ti is selected to be not less than 0.3.

12. A method of manufacturing strontium titanate fine powder according to claim 10, wherein a molar ratio, Sr/Ti is selected to be in a range from 0.5 to 4.

13. A method of manufacturing strontium titanate fine powder according to claim 10, wherein a reacting temperature is selected to be not less than 20° C.

14. A method of manufacturing strontium titanate fine powder according to 10, wherein a reaction temperature is selected to be in a range from 60° C. to a boiling point of the aqueous solution.

15. A method of manufacturing strontium titanate fine powder according to claim 10, wherein a water soluble strontium salt is selectd from $Sr(NO_3)_2$, $Sr(OH)_2$, $SrCl_2$, $Sr(CH_3COO)_2$ and SrO.

16. A method for manufacturing a calcium titanate fine powder having the formula CaTiO3 comprising the steps of:

preparing a hydrolysis product of an inorganic titanium compound $TiO_2 \cdot xH_2O$ by dissolving said inorganic titanium compound in a neutral or alkaline aqueous solution.

reacting said hydrolysis product with a water soluble salt of Ca in an aqueous alkaline solution having a pH not less than 13 to thereby obtain said calcium titanate fine powder, and filtering said fine powder from the remaining solution.

17. A method of manufacturing calcium titanate fine powder according to claim 16, wherein said aqueous alkaline solution has pH value not less than 13.2.

18. A method of manufacturing calcium titanate fine powder according to claim 16, wherein a molar ratio, Ca/Ti is selected to be not less than 0.3.

19. A method of manufacturing calcium titanate fine powder according to claim 16, wherein a molar ratio, Ca/Ti is selected to be in a range from 0.6 to 10.

20. A method of manufacturing calcium titanate fine powder according to claim 16, wherein a reaction temperature is selected to be not less than 70° C.

21. A method of manufacturing calcium titanate fine powder according to claim 16, wherein a reaction temperature is selected to be in a range from 25° C. to a boiling point of the aqueous solution.

22. A method of manufacturing calcium titanate fine powder according to claim 16, wherein a water soluble calcium salt is selected from $Ca(NO_3)_2$, $Ca(OH)_2$, $CaCl_2$, $Ca(CH_3COO)_2$ and $CaO$.

* * * * *